United States Patent [19]

Hourai

[11] 4,130,613

[45] Dec. 19, 1978

[54] LOW NOISE COOLING TOWER

[75] Inventor: Akimasa Hourai, Amagasaki, Japan

[73] Assignee: Shinko-Pfaudler Company, Ltd., Kobe, Japan

[21] Appl. No.: 752,431

[22] Filed: Dec. 20, 1976

[30] Foreign Application Priority Data

Jan. 17, 1976 [JP] Japan ..................................... 51-4308

[51] Int. Cl.$^2$ ................................................ F28C 1/04

[52] U.S. Cl. ............................ 261/109; 261/DIG. 11

[58] Field of Search ................................ 261/109-112, 261/DIG. 11, DIG. 77; 165/DIG. 1

[56] References Cited

U.S. PATENT DOCUMENTS

| | | | |
|---|---|---|---|
| 1,334,515 | 3/1920 | Braun | 261/DIG. 11 |
| 1,855,526 | 4/1932 | Mart | 261/109 |
| 1,920,642 | 8/1933 | Hoffmann | 261/DIG. 11 |
| 2,612,359 | 9/1952 | Simpson | 261/DIG. 11 |
| 2,833,122 | 5/1958 | Kohl et al. | 261/DIG. 11 |
| 3,117,170 | 1/1964 | Mart et al. | 261/DIG. 11 |
| 3,687,425 | 8/1972 | Katz | 261/DIG. 11 |
| 3,759,496 | 9/1973 | Teller | 261/DIG. 11 |
| 3,903,212 | 9/1975 | Lefevre | 261/DIG. 11 |
| 3,987,845 | 10/1976 | Potthoff et al. | 261/DIG. 11 |

*Primary Examiner*—Richard L. Chiesa
*Attorney, Agent, or Firm*—Kurt Kelman

[57] ABSTRACT

When a crossflow water cooling tower is operated, noise made by an air circulating device and water falling down inside the tower is propagated outside. In the conventional cooling towers, however, the main source of the noise, namely the noise of the falling water was very incompletely insulated. The air entering space provided according to this invention and defined by at least a pair of inclined walls and a pair of parallel side walls is in an upward-widening structure whereby the noise produced inside the tower by the flowing and falling water is dissipated upward so as to significantly reduce the noise propagated to the surrounding area.

3 Claims, 3 Drawing Figures

2″ 8 6 3 5 7 14 2 2′ 1′ 4 13 12 1 11 10 9 9′

LOW NOISE COOLING TOWER

BRIEF SUMMARY OF THE INVENTION

The present invention relates to a crossflow cooling tower, and more particularly, to the low noise cooling tower of a structure capable of considerably reducing the effect of the noise produced during operation thereof on the direct environment.

As knowledge on public nuisance resulting from industrial noise became prevalent in recent years, it became required for an industrial plant not only to give consideration to the effect of the noise of the plant on the nearby housing area but also to try its best to minimize the noise level in the plant. A water cooling tower, for example, should be reduced in noise since it is one of the noise sources imposing restriction on the plant location.

In a forced-draft cooling tower, a draft system essentially comprising a fan, gear reducer, and motor is a main source of noise. Another main source of noise is the water falling inside the tower. Particularly in a conventional crossflow cooling tower, the tower has open ends serving as louvered air inlets so that fresh air can enter as uniformly as possible through fill within the tower and with as low pressure loss as possible. In such a conventional structure of the crossflow cooling tower, it is impossible to prevent the noise produced by the water falling down out of the upper hot water tank toward the lower cold water tank through the inside fill from being propagated through said air inlets to the neighborhood. The result is that the noise of the falling water and of the draft system make the noise level of the entire tower very high.

In the conventional crossflow cooling tower, a known falling water noise prevention device comprises extensions of two side walls of the tower and a vertical wall positioned opposite to the air inlet at a suitable distance therefrom so as to surround the air inlet on three sides allowing the outside air flowing thereinto through the upper and lower open faces. This known device is, however, unable to obtain sufficient noise reduction effect because of bypassing of the noise through the lower openings in the walls.

Accordingly, it is a primary object of the present invention to overcome the deficiencies of the previously known cooling towers and more particularly to provide an improved crossflow water cooling tower provided with open top noise prevention walls formed integrally with the tower and comprising first inclined walls each closed at the lowest portion and forming with an air inlet face of the fill an outside air entrance space having an upward-widening side configuration, and extensions of two side walls connected to said first inclined walls. In the cooling tower of this structure, the falling water noise is directed upward by the noise prevention walls to thereby considerably reduce the noise which will otherwise be propagated to the neighborhood and, make it possible to remove louvers in the air inlet faces of the fill.

It is a further and more specified object of the present invention to provide an improved crossflow water cooling tower comprising said component parts and second noise prevention walls surrounding a draft system on a fan deck and formed of second inclined walls each extending inwardly upward at an angle from the outer edge of the hot water tank and upward extensions of a pair of the tower side walls. The provision of the second noise prevention walls has made it possible to reduce the noise of the draft system and to prevent the recirculation of the hot wet air discharged from the top of the tower.

BRIEF DESCRIPTION OF DRAWINGS

These and other objects and features of the present invention will be better understood from the following description taken in connection with the accompanying drawings in which.

DETAILED DESCRIPTION OF THE INVENTION

Figure 1:
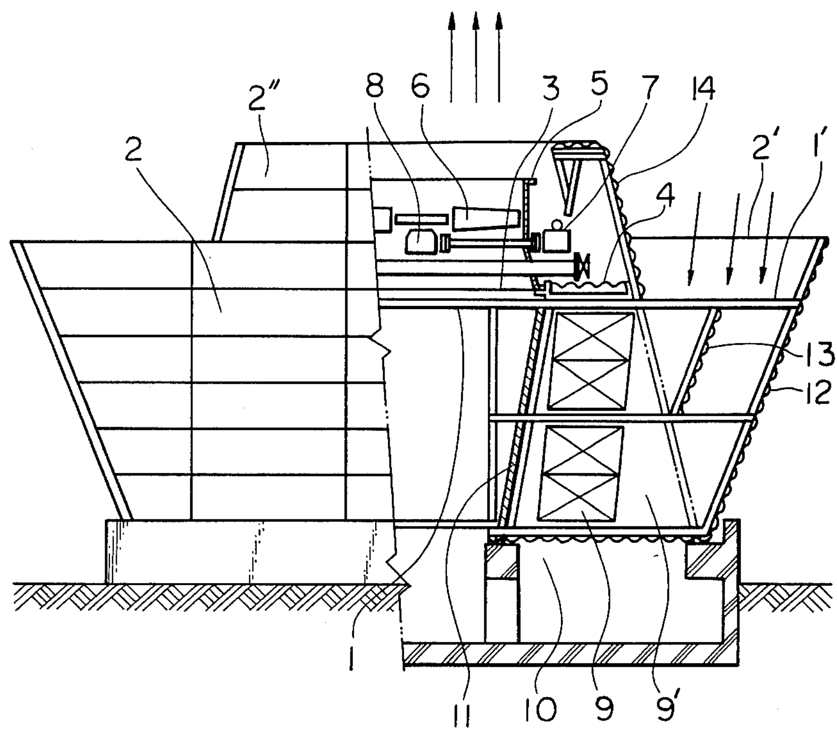
FIG. 1 is a partially broken away side elevation of a double crossflow water cooling tower according to the first embodiment of the present invention.

Referring now to the drawings, certain preferred embodiments of the present invention will be described in detail.

FIG. 1 shows an embodiment of double crossflow water cooling tower of the present invention. Since this embodiment is of symmetric structure as shown in FIG. 1, the internal structure thereof is shown for the right side half only and the detailed explanation of the left side half will be occasionally omitted. The central portion of this cooling tower has a structure substantially identical to that of the conventional cooling tower of this type comprising a frame work of strengthening angle structural members 1, a pair of vertical side walls 2 of asbestos cement boards parallel to each other and mounted on the sides of said frame work, a horizontal fan deck 3 located centrally and connected to the side walls 2 at the upper portion, and hot water distribution tanks 4 provided at opposite ends of said deck 3 for surrounding therewith the upper portion of the tower which is open to atmosphere at both right and left ends (FIG. 1) as air inlets. At the center of the fan deck 3 there is opened an air outlet upward of which extends a fan cylinder 5 in which is provided a fan 5 which is driven by a motor 7 through a reducer gear 8 for discharging hot wet air from the central space of the tower. At both ends of the central space of the tower and downward of the hot water distribution tanks 4 there are provided fills 9 covering the entire openings of said air inlets. Beneath the fills 9 there is provided a cold water tank 10 of concrete serving also as a foundation supporting the tower body.

Since the water to be cooled while falling under the force of gravity from the hot water distribution tank 4 through the fill 9 into the cold water tank 10 is deflected toward the center of the tower by the flow of the cooling air taken into the tower from the air inlet and directed horizontally through the fill by the fan 6, the fill 9 is inclined in the direction of the center of the tower to conform with the direction of the falling water. A drift eliminator 11 is provided opposite to the inner side face of each fill 9. According to the present invention, louvers which were heretofore considered necessary to the air inlets of this type of cooling tower are made unnecessary by virtue of the structure to be described in detail hereinunder.

The embodiment of the cooling tower according to the present invention shown in FIG. 1 differs from the conventional cooling towers of this type in that the frame work of the structural members 1, a pair of the side walls 2, and the cold water tank 10 are extended outward still further than in the conventional cooling towers. A first inclined wall 12 of asbestos concrete board extending outwardly upward from each end edge of the extended cold water tank 10 to a height above fill 9 is mounted on a structural frame extension 1' to define a space having an upward-widening side elevation with an inclined air inlet face 9' of the fill 9. This space is surrounded on opposite sides by wall extensions 2' connected to the first inclined wall 12 of a pair of the side walls 2 and open at the top. Said side walls 2 are sealed at the lower edges to the upper peripheral edges of the cold water tank 10. When necessary, an auxiliary inclined wall 13 which is substantially parallel to the first inclined wall 12 may be provided intermediate between the inclined air inlet face 9' of the fill 9 and the first inclined wall 12 and opposite to the upper portion of the fill.

The louvers heretofore deemed necessary in water cooling tower can, as mentioned hereinabove, be omitted in the present invention partly because the inclined walls 12 and 13 serve to distribute the fresh air entering from above substantially uniformly over the inclined air inlet face of the fill and partly because a part of the water to be cooled being splashed from the inclined air inlet face 9' of the fill falls on said extensions of the cold water tank 10 without escaping out of the tower. Since the noise produced by the water falling through the fill is directed upward by the inclined walls 12 and 13 and since these walls of asbestos cement boards have a sound-absorbing effect due to their own mass, the noise propagated to the neighboring area is markedly reduced according to the present invention.

In the cooling tower shown in FIG. 1, the frame work of the structural members 1 and a pair of the side walls 2 are extended also upward within the reach of the outer end edges of a pair of the hot water distribution tanks 4. Second inclined walls 14 of asbestos cement boards extending inwardly upward from the outer end edges of a pair of the hot water tanks 4 are provided to form with upper extensions 2" of the side walls 2 connected thereto a second noise prevention wall defining an open-top space having an upward-narrowing side elevation.

The second noise prevention wall, as the first noise prevention wall comprising the walls 12, 13 and 2', serves to reduce the propagation of the noise produced by the draft system to the surrounding area and to direct upward the hot wet air discharged from the fan cylinder 5 so as not to be drawn into the air inlets again, thereby preventing the recirculation of the discharged air.

We have made comparative noise measurements on the cooling tower according to the present invention shown in FIG. 1 and a conventional cooling tower of comparable dimensions at a few locations at a distance of one meter from the tower surface. The results of our measurements show that the noise level of the conventional cooling tower was 82dB(A) at the location above the central portion of the tower, 75dB(A) on the motor side at the upper end of the louvers of the air inlet, 72dB(A) on the opposite side of the tower, 71dB(A) at the lower end of the louvers, and the noise level of the cooling tower according to the present invention remained 82dB(A) at the location above the central portion of the tower, but was considerably reduced at other locations, for example, 61dB(A) on either side at the upper end of the first inclined walls 12, and 55dB(A) at the lower end thereof. Thus, the cooling tower structure provided by the present invention has achieved a significant reduction in the level of noise propagated to the surrounding area. Our further comparative noise measurements at locations with gradually increased endwise distance from the tower show that the difference in noise level between the conventional cooling tower and that according to the present invention is kept without substantial change therebetween in the noise propagated endwise and decreasing.

The noise can be further reduced by lining said noise prevention walls with sound-absorbing material such, for example, as glass wool. Increase in cost due to the working of the present invention is estimated to be approximately 8% only. The present invention provides an additional advantage that the appearance of the tower is considerably simplified.

Figure 2:
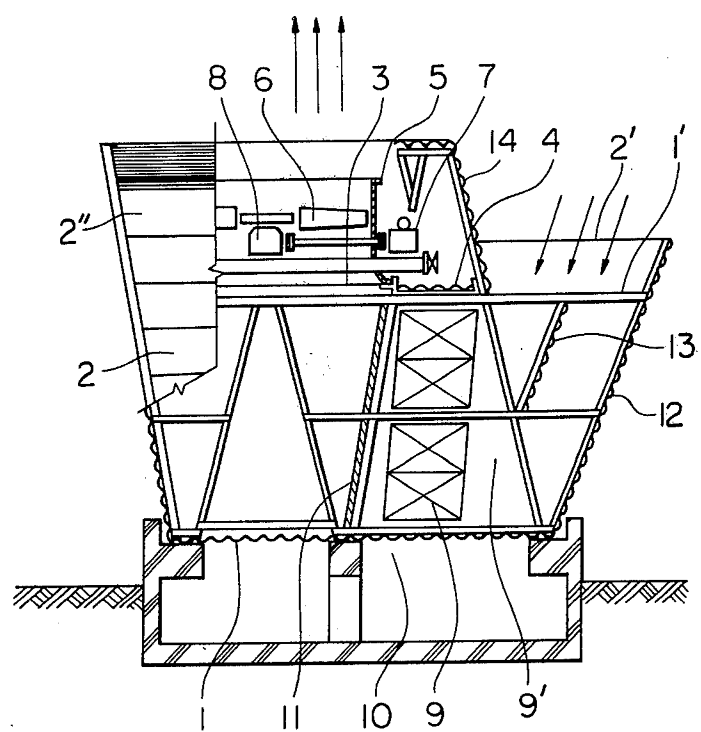
FIG. 2 is a greater part broken away side elevation of a single crossflow water cooling tower according to the second embodiment of the present invention.

FIG. 2 shows an embodiment of a low noise single crossflow cooling tower according to the present invention having fill at one end only allowing air to enter therethrough while the other end is closed by an end wall.

Figure 3:
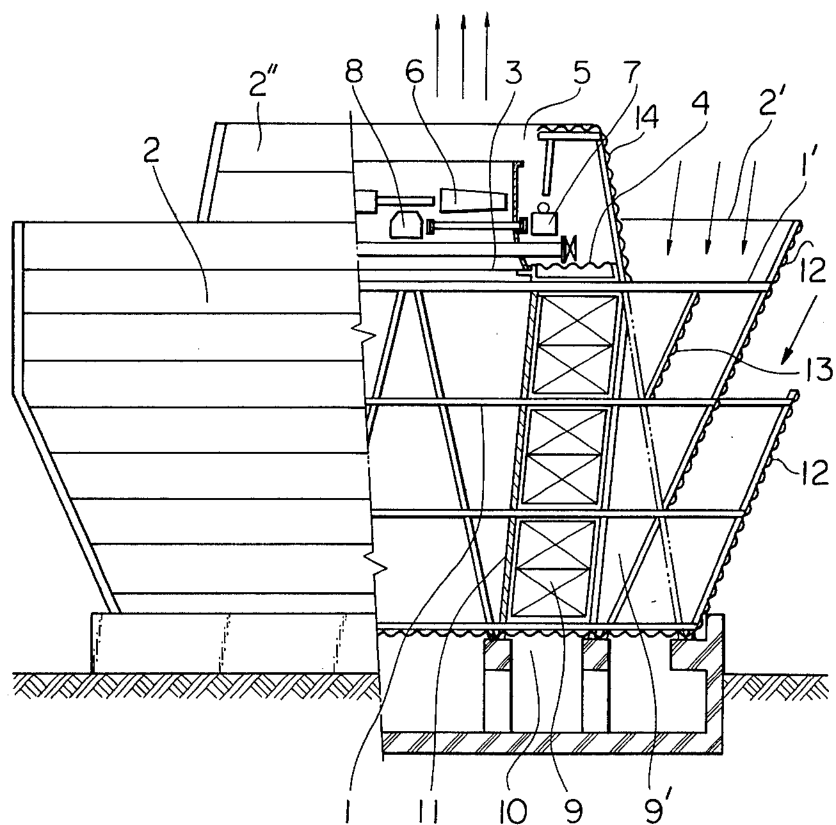
FIG. 3 is a partially broken away side elevation of a double crossflow water cooling tower according to the third embodiment of the present invention.

FIG. 3 shows an embodiment of a low noise large double crossflow cooling tower according to the present invention having a duplex first inclined wall 12 as shown.

In FIGS. 2 and 3, parts similar to those of FIG. 1 are given the same reference numerals and further explanation thereof is omitted to avoid needless repetition.

While we have shown and described specific embodiments of our invention, it will be understood that these embodiments are merely for the purpose of illustration and description and that various other forms may be devised within the scope of our invention, as defined in the appended claims.

I claim:

1. A crossflow water cooling tower comprising, in combination, a cold water tank serving also as foundation; hot water distribution means arranged above, said cold water tank; fill means arranged between said cold water tank and hot water distribution means, the fill means having an upper surface receiving water from said hot water distribution means, a lower surface discharging water into said cold water tank, an outer side adapted to serve as an air inlet face, an inner side adapted to serve as an air outlet face, a front side and a rear side; a pair of substantially vertical, horizontally spaced, substantially imperforate side walls covering said front and rear sides and extending inwardly and outwardly therefrom; a fan deck connecting said side walls; air draft means on said deck having an air outlet for forcing air from said air inlet face through said fill means to said air outlet face in a direction transverse to the flow of water from said hot water distribution means to said cold water tank, and through said air outlet in an upward direction; means for connecting said air draft means to said vertical side walls inwardly of said air outlet face of said fill means; said cold water tank extending outwardly from said air inlet face of said fill means and having an end edge along its outward extremity; and further comprising a first inclined substantially imperforate wall extending outwardly upward from said end edge of said cold water tank along the entire height of said fill means; and each of said vertical side walls having an outer edge connected to said first inclined wall along the full height thereof and a lower edge sealed to said cold water tank, thereby defining, with said first inclined wall, an upwardly widening air inlet space having substantially imperforate walls preventing horizontal propagation of low frequency noise, said first inclined wall further causing high frequency noise components to be directed upwards.

2. A crossflow water cooling tower as set forth in claim 1, wherein said hot water distribution means comprises a hot water distribution tank having an outer edge extending along the top of said outer side of said fill means; and further comprising a second inclined wall extending inwardly upward from said outer edge of said hot water distribution tank; said vertical side walls comprising upward extensions above the level of said hot water distribution tank, said upward extensions having outer edges connected to said second inclined wall.

3. A crossflow water cooling tower as set forth in claim 1, further comprising an auxiliary inclined wall arranged opposite said inlet face along the upper portion of said fill, substantially parallel to said first inclined wall, and located intermediate between said air inlet face of said fill means and said first inclined wall.

* * * * *